United States Patent [19]

Bobbitt

[11] Patent Number: 5,342,004
[45] Date of Patent: Aug. 30, 1994

[54] AIRFOIL TRAILING FLAP

[75] Inventor: Percy J. Bobbitt, Newport News, Va.

[73] Assignee: Eagle Aerospace, Inc., Houston, Tex.

[21] Appl. No.: 955,678

[22] Filed: Oct. 2, 1992

[51] Int. Cl.$^5$ ................................................ B64C 9/22
[52] U.S. Cl. .................................. 244/212; 244/215; 244/219
[58] Field of Search ............ 244/212, 213, 215, 35 R, 244/198, 219

[56] References Cited

U.S. PATENT DOCUMENTS

| | | | |
|---|---|---|---|
| 3,952,971 | 4/1976 | Whitcomb | 244/35 R |
| 4,471,927 | 9/1984 | Rudolph et al. | 244/215 |
| 4,575,030 | 3/1986 | Gratzer | 244/212 X |
| 4,725,026 | 2/1988 | Krafka et al. | 244/219 |
| 4,813,631 | 3/1989 | Gratzer | 244/35 R |
| 4,858,852 | 8/1989 | Henne et al. | 244/35 R |
| 4,867,396 | 9/1989 | Wainfan | 244/215 |
| 5,178,348 | 1/1993 | Bliesner | 244/213 X |

OTHER PUBLICATIONS

Taylor, A. B. "Development of Selected Advanced Aerodynamics and Active Control Concepts for Commercial Transport Aircraft" NASA CR-3781, Feb., 1984, pp. 19-30 of 98 pages.
In the references below, AIAA is the American Institute of Aeronautics and Astronautics, Inc., and ICAS is the International Council of the Aeronautical Sciences.
Harris, C. D. "NASA Supercritical Airfoils-A Matrix of Family-Related Airfoils" NASA TP-2969, Mar. 1990, 72 pages.
Bauer, F., Garabedian P., Korn, D. and Jameson, A. "Supercritical Wing Sections II-A Handbook" Lecture Notes in Economics and Mathematical Systems, Control Theory, Beckmann, M. and Kunzi, H. P. Eds.,. Springer-Verlag, vol. 108, 1975, 296 pages.
Henne, P. A. and Gregg, R. D. "A New Airfoil Design Concept" AIAA 7th Applied Aerodynamics Conference, Jul. 31-Aug. 2, 1989, 89-2201-CP, pp. 333-345.
Krenz, G. and Hilbig, R. "Aerodynamic Concepts for Fuel-Efficient Transport Aircraft" 13th Congress of the International Council of the Aeronautical Sciences, AIAA Aircraft Systems and Technology Conference, Aug. 22-27, 1989, ICAS-82-1.5.2, pp. 800-810.
Gato, W. and Masiello, M. F. "Innovative Aerodynamics: The Sensible Way of Restoring Growth Capability to the EA-6B Prowler" AIAA 5th Applied Aerodynamics Conference, Aug. 17-19, 1987, 87-2362, pp 286-299.
Waggoner, E. A. and Allison, D. O. "EA-6B High-Lift Wing Modifications" AIAA 5th Applied Aerodynamics Conference, Aug. 17-19, 1987, 87-2360-CP, pp. 1-13.
Sewall, W. G., McGhee, R. J. and Ferris, J. C. "Wind-Tunnel Test Results of Airfoil Modifications for the EA-6B" AIAA 5th Applied Aerodynamics Conference, Aug. 17-19, 1987, 87-2359, CP, pp. 1-12.

(List continued on next page.)

Primary Examiner—David M. Mitchell
Assistant Examiner—Christopher P. Ellis
Attorney, Agent, or Firm—E. Richard Zamecki

[57] ABSTRACT

Improvements in airfoils, such as conventional airfoils, are disclosed including modifications to the final flap element of the airfoil. Disclosed are surface contour modifications, including, in some instances, extensions of the chord of the final flap element, adding camber to the final flap element to enhance the performance of the airfoil by reducing its drag per lift, and providing greater lift for a given angle of attack.

13 Claims, 6 Drawing Sheets

OTHER PUBLICATIONS

Hanley, R. J. "Development of an Airframe Modification to Improve the Mission Effectiveness of the EA-6B Airplane" AIAA 5th Applied Aerodynamics Conference, Aug. 17-19, 1987, 87-2358, pp. 241-247.

Jordan, F. L., Hahne, D. E., Masiello, M. F. and Gato, W. "High-Angle-of-Attack Stability and Control Improvements for the EA-6B Prowler" AIAA 5th Applied Aerodynamics Conference, Aug. 17-19, 1987, 87-2361-CP pp. 1-16.

Harris, C. D. "Wind-Tunnel Investigation of Effects of Trailing-Edge Geometry on a NASA Airfoil Section" NASA TM X-2336, Sep. 1971, 75 pages.

Allison, D. O. and Waggoner, E. G. "Prediction of Effects of Wing Contour Modifications on Low-Speed Maximum Lift and Transonic Performance for the EA-6B Aircraft" NASA TP-3046, Nov., 1990, 45 pages.

Waggoner, E. G. "Development of High-Lift Wing Modifications for an Advanced Capability EA-6B Aircraft" Progress in Astronautics and Aerodynamics, Seebass, A. R., Ed, Applied Computational Aerodynamics, Henne, P. A., Ed., vol. 125, American Institute of Aeronautics and Astronautics, Inc., 1989, pp. 435-457.

Capone, F. J. "Longitudinal Aerodynamic Characteristics of a Twin-Turbofan Subsonic Transport with Nacelles Mounted under the Wings" NASA TN D-5971, Oct., 1970, 93 pages.

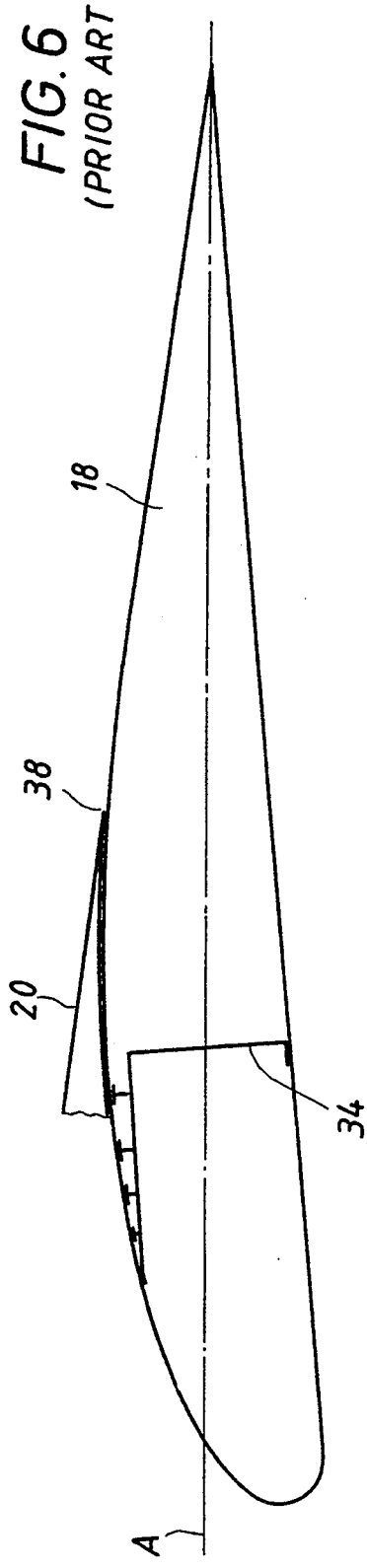
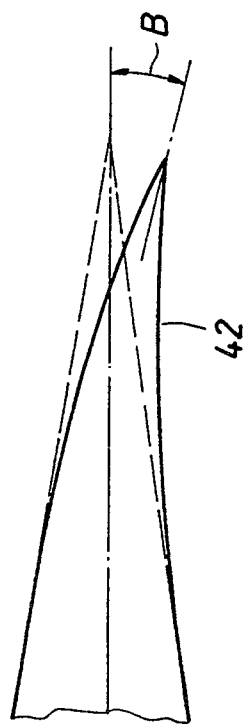
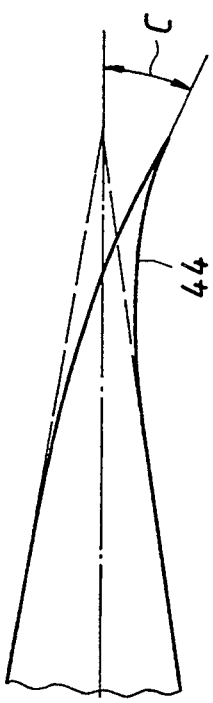
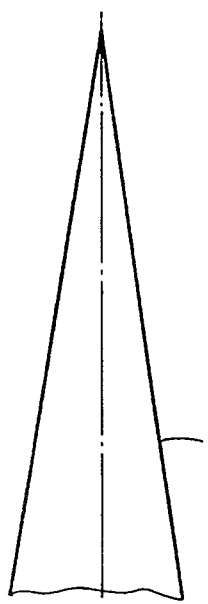

AIRFOIL TRAILING FLAP

BACKGROUND OF THE INVENTION

1. Field of the Invention

The present invention pertains to airfoils for aircraft and the like. More particularly, the present invention relates to the construction and function of airfoils for improved performance, and finds particular application to the improvement of conventional airfoils by way of the construction and function of the trailing flap of such an airfoil.

2. Brief Description of Prior Art

The functioning of an airfoil, such as an aircraft wing, is affected by the airfoil's maximum thickness, thickness distribution, camber and camber distribution, Mach and Reynolds numbers, and the extent of laminar flow over the airfoil surfaces. A significant development in airfoil construction occurred with the development of the supercritical airfoil, designed for more efficient transonic flight. The supercritical airfoil can be designed for a given lift coefficient and thickness with a specific upper surface contour having lower drag at transonic speeds than that of previous airfoils. Generally, supercritical airfoils have larger leading edge radii and less surface curvature in the mid-chord region of the upper surface than earlier, conventional airfoils. The chord of a structure such as an airfoil or a flap is the maximum distance between the trailing edge of the structure and the foremost point on the leading edge of the structure. Supercritical airfoils are also characterized by substantial camber and low thickness near the trailing edge of the airfoil.

Various proposals to improve the performance of supercritical airfoils, such as to reduce drag at higher Mach numbers, have been made. These included making the trailing edge thicker by adding material to the lower surface, which also resulted in an increase in camber. In general, increasing the trailing edge thickness increases the drag generally without dependence on Mach number, but also produces a decrease in drag due to increased aft camber which can be sensitive to changes in Mach number. Thus, at some Mach number, the reduction in drag due to the camber effect outweighs the increase in drag due to the increased thickness of the trailing edge. If camber is increased excessively even without adding thickness to the trailing edge of a supercritical airfoil, the expected reduction in drag may be offset by increased drag due to flow separation near the trailing edge.

The primary mechanism that produces a reduction in drag with increased aft camber is the ability of the airfoil to achieve the same lift at a lower angle of attack with such increased camber; further, the lift is more evenly distributed over the chord, particularly for conventional, that is, nonsupercritical, airfoils. The lower negative pressure on the upper surface reduces the strength of any shocks and the attendant-wave drag. Additionally, a reduction in the adverse pressure gradient over the forward and middle portions of the airfoil minimizes flow separation, and thus reduces pressure drag.

Another approach used to enhance the performance of both conventional and supercritical airfoils involved adding a blunt wedge to the underside of the airfoil trailing edge, thereby increasing the thickness of the trailing edge as well as the camber at that point of the airfoil. The wedge may be constructed such that the thickness of the airfoil actually increases approaching the trailing edge. Variations in the relative shape and length of the wedge change the amount of effective trailing edge camber as well as the thickness of the trailing edge. Such a modification causes a drag reduction at mid-to-high section lift coefficients at Mach numbers approaching the drag rise Mach number.

Another approach to increasing the camber of an airfoil is to rerig the trailing edge flap element and/or aileron, by generally tilting such element downwardly to the rear of the airfoil.

In yet another approach to enhancing the performance of a conventional airfoil, camber was added to the trailing edge flap to increase the lift for a given angle of attack by making the underside surface toward the rear of the trailing edge flap concave. At the same time, the leading edge radius of the airfoil was increased to reduce the possibility of a separation bubble occurring at that location at high lift coefficients and to provide a more uniform lift distribution. Further, the top surface toward the rear of the trailing edge flap was made concave. This approach was modified by making the rear portion of the upper surface of the trailing edge flap straight, and then finally convex, in each instance further increasing the camber of the trailing edge flap and reducing the trailing edge thickness, compared to the flap with a concave upper surface, with the result of increasing lift and decreasing drag.

None of the aforementioned efforts to enhance the performance of conventional and supercritical airfoils established that a thick trailing edge on an airfoil can have less drag than a sharp trailing edge with the same camber. For structural and safety reasons, the trailing edge of wings always have a small, but finite, thickness. A sharp trailing edge is considered herein as one with a thickness on the order of one-tenth of one percent of the chord or less.

Airplanes designed twenty or thirty years ago do not have the same level of aerodynamic technology utilized in airplanes currently being constructed. FIGS. 1-3 illustrate contours of conventional airfoils typical of those employed in the 1950's and 1960's for commercial transport airplanes. Such conventional airfoils are similar to those utilized on several fighters of the Word War II era and on a number of military aircraft from the post war years as well. Such airfoils, such as illustrated in FIGS. 1-3, have a smaller nose radius than most present day supercritical airfoils, and a larger wedge angle at the trailing edge as well. Almost no camber is present over the last thirty or forty percent of the chord. Many airfoil sections in common use in the 1960's and 1970's have such trailing edges, with only modest contouring of the upper and/or lower surface, providing only small amounts of camber near the trailing edge.

It would be advantageous and desirable to provide a practical modification to conventional airfoils, for example, to increase their performance parameters to more closely approximate performance of supercritical airfoils, for example. It is an object of the present invention to provide such an improvement in the design of those airfoils. It is a further object of the present invention to provide a practical improvement in the construction of conventional airfoils, and even more modern technology airfoils, to enhance performance characteristics of such airfoils. It is a further object of the present invention to provide an improvement to airfoils to reduced their cruise drag and increase their lift capability for a given angle of attack.

SUMMARY OF THE INVENTION

The present invention increases the performance parameters of airfoils, particularly conventional airfoils, by increasing their lift at a given angle of attack, and increasing their lift-to-drag ratio. The present invention enhances the performance parameters of conventional airfoils, for example, by modifying the contour of the final flap elements in such airfoils. Further, such modifications according to the present invention may be effected without changing the internal structural elements of a final flap element, such as spars, for example. Modifications of a final flap element according to the present invention may be carded out by applying curvature to the upper surface trailing edge of the flap element, and making the bottom surface concave, either by curvature of that surface or by means of adjusting the straight line contour. Further, the present invention may involve such modifications to the upper and lower surfaces of the trailing edges of a final flap element with or without extending the chord of the element. Also, the final flap element may be modified according to the present invention by generally maintaining the geometry of the unmodified flap, and adding material to extend the chord and, therefore, both the upper and lower surfaces at the trailing edge. All modifications of the final flap element according to the present invention add camber and a non-zero effective flap angle to that element, with the result that the airfoil as a whole is provided camber of sufficient mount to significantly affect the aforementioned flight characteristics.

BRIEF DESCRIPTION OF THE DRAWINGS

FIG. 6 is an enlarged, fragmentary illustration of the trailing portion of the 737 airfoil of FIG. 4, showing the last flap element and the trailing edge of the second flap element of the airfoil;

FIG. 10 is a fragmentary schematic illustration of the contour of a trailing edge of a conventional airfoil, showing the wedge shape of the contour;

FIG. 11 is a view similar to FIG. 10, but showing a wedge-shaped trailing edge contour modified to provide a non-zero effective flap angle;

FIG. 12 is a view similar to FIG. 11, but with the addition of a deeper concave curvature on the bottom surface of the flap contour, resulting in the upper and lower surfaces becoming parallel at the trailing edge, and a larger effective flap angle;

DESCRIPTION OF PREFERRED EMBODIMENTS

Figure 1:
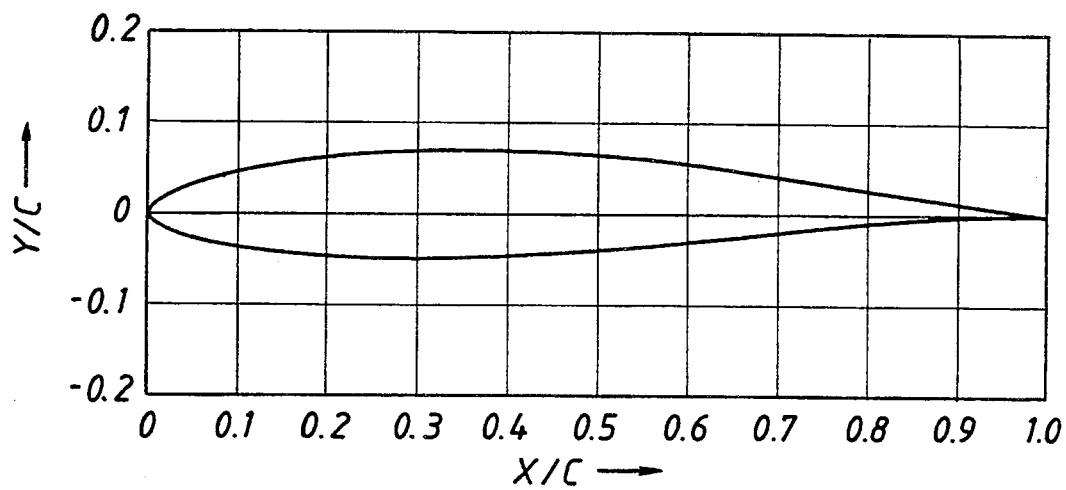
Fig. 1 is an illustration of a mid-span contour of a conventional airfoil having a generally wedge-shaped trailing edge and little trailing edge camber, provided on a scale marked in tenths of the chord C, or displacement between the leading and trailing edges, of the airfoil.
Figure 2:
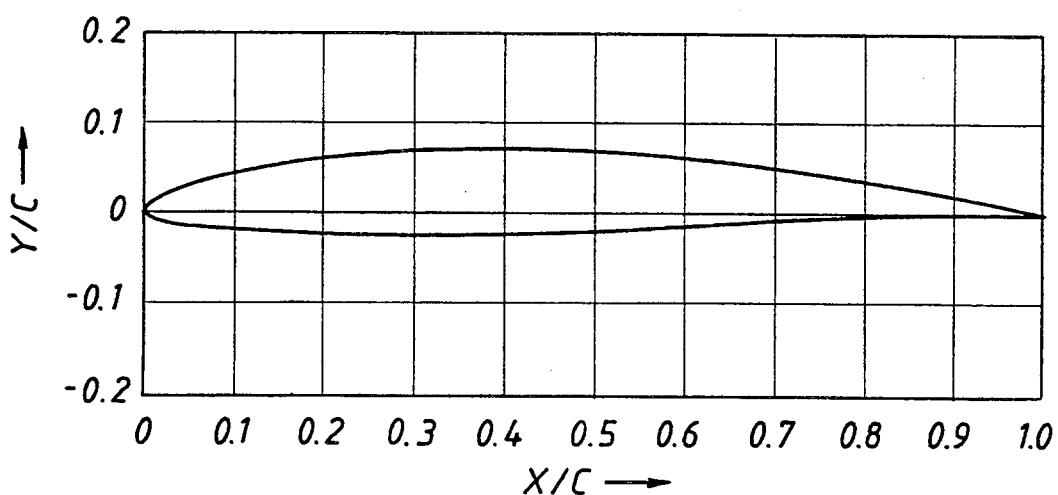
FIG. 2 is an illustration similar to FIG. 1, but showing a conventional airfoil having increased trailing edge camber compared to the airfoil of FIG. 1.
Figure 3:
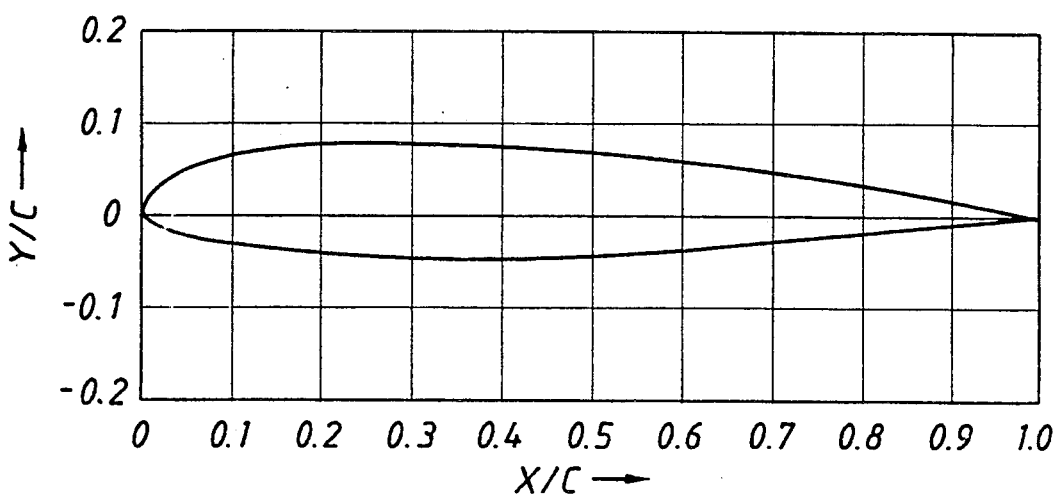
FIG. 3 is an illustration similar to those of FIGS. 1 and 2, but showing another conventional airfoil contour with a more pronounced wedge-shaped trailing edge, again with little trailing edge camber.

All transport aircraft wings are equipped with a high lift system. This system generally includes a double or triple-slotted trailing edge flap system and, in some cases, a leading edge flap, or slat, as well. Details of such a lift system may be appreciated by reference to FIG. 4, wherein the mid-space contour of a Boeing 737 wing airfoil is indicated generally at 10. The airfoil 10 includes an interior frame 12 covered by an outer skin 14, and multiple flaps whose positions may be adjusted relative to the airfoil to vary the aerodynamic characteristics of the airfoil. For example, a forward flap, or slat, 16 is positioned over the nose, or leading edge, of the airfoil, and may be rotated forward and downwardly from the retracted position illustrated to increase the lift capability of the airfoil. At the other end of the airfoil contour 10, a trailing edge flap 18 is shown in retracted position against the next-to-last flap 20, both of which elements may be extended downwardly in a backward direction for increased lift. A third flap 22 is positioned under the spoiler 24 on the main body of the airfoil 10, from which position the flap 22 may also be extended downwardly and to the rear of the assembly. Such extended flap positions are utilized, for example, in take-off and landing procedures. Typically, the last flap element of a triple-slotted flap system, such as the last flap 18 in FIG. 4, extends over the last five to ten percent of the airfoil chord.

Figure 5:
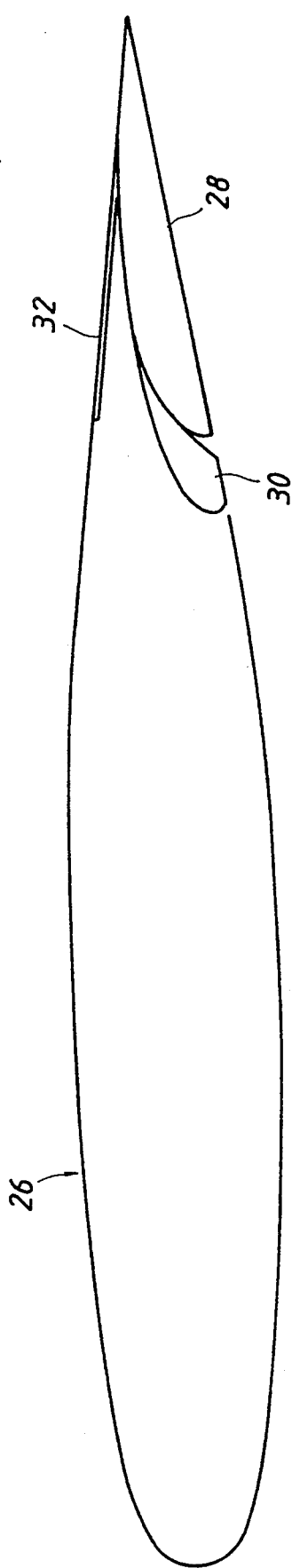
FIG. 5 is an illustration similar to FIG. 4, but showing the contour of a conventional airfoil with a double-slotted trailing edge flap system.

The mid-span contour of a conventional airfoil having a double-slotted lift system is shown generally at 26 in FIG. 5. In such a double-slotted flap system, the final flap 28 may extend over twenty-five percent, or more, of the chord of the airfoil. A spoiler 32 extends over the final flap 28. The final flap 28 as well as the next-to-last flap 30 may be extended downwardly and to the rear of the airfoil 26.

The present invention is directed to improving the performance of an airfoil by modifying primarily the last flap element of the airfoil. One of the problems to be faced in modifying an airfoil is the constraints provided by its existing geometry, for example. As may be appreciated by reference to FIGS. 4 and 5, the top side of the last flap element in retracted position is partially covered by the flap element just ahead of the last flap element or by the airfoil spoiler. When the last flap element is in the stored, or retracted, position, only the part of the surface of the last flap element that is exposed to the flow is available for modification to affect the flow at cruise conditions. This generally includes the entire bottom surface and only the back portion of the upper surface of the flap. The smaller the chord of the last flap element, the less the top surface of the last flap element is likely to be exposed to the flow, and the more difficult it is to obtain a significant benefit in airfoil performance through modification of the last flap element. However, according to the present invention, the final flap element of a conventional airfoil can be modified, generally without changing the lines of any other airfoil component, and still achieve a significant and useful enhancement of the performance of the airfoil. Since improving the airfoil according to the present invention may involve only the modification of the final flap element of the airfoil, existing conventional airfoils can be so modified practically and with sufficiently low cost to recover the expense of modification through increased performance of the airfoil in a reasonable period of time.

The present invention is particularly useful for modifying the contour of the last flap element of the high lift system of a conventional airfoil to reduce the drag of the airfoil at cruise lift coefficients, and is most effective when applied to wings with wedge-like trailing edges and little or no camber near the trailing edge, or with trailing edges with modest contouring of the upper and/or lower surface providing only a small amount of camber near the trailing edge. Typically, application of the present invention to a conventional airfoil will reduce the drag experienced by the airfoil at cruise conditions, on the order of 0.65 Mach or greater, by at least two percent.

Figure 4:
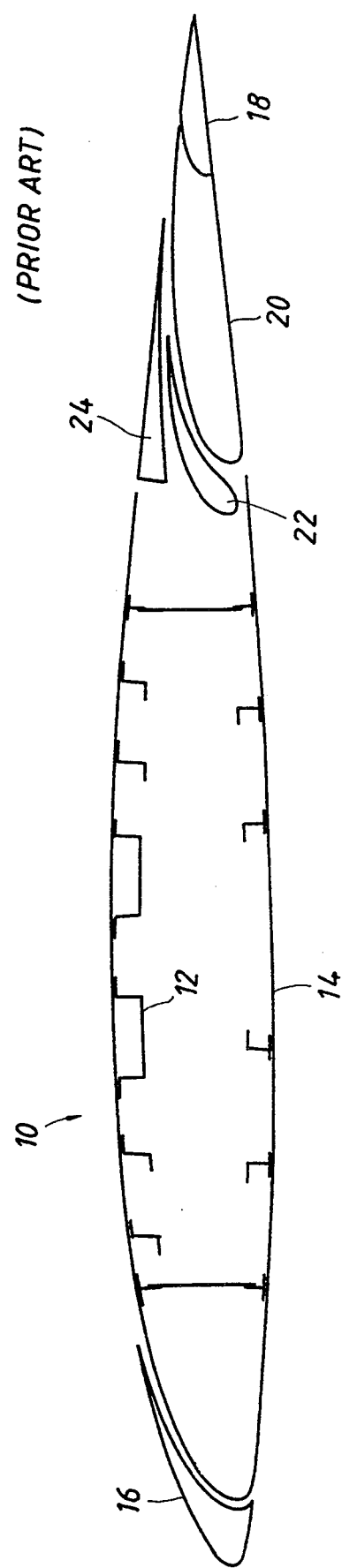
FIG. 4 is a schematic illustration of a mid-span section through a Boeing 737 airfoil, illustrating the high lift system of the wing.

FIG. 6 shows the last flap 18 of the airfoil 10 of FIG. 4. The wing airfoil reference chord line is indicated by A. As may be further appreciated with reference to FIG. 6, while the upper surface of the final flap element 18 is available for modification only over the final forty percent of its chord, the bottom surface is completely exposed to the airflow and, theoretically, available for modification. However, a lateral flap spar 34 is positioned toward the front half of the final flap element 18, and would have to be replaced or reconstructed to accommodate lower surface modification in that portion of the flap element. The present invention, however, may be achieved by limiting lower surface modification of the final flap element to the portion of the flap element behind the spar in question. By contouring the upper and lower surfaces of the final flap element thus available for modification, the present invention may nevertheless achieve significant airfoil performance enhancement.

Choice of the type of flap modification according to the present invention best suited for a given airfoil will depend on considerations involving structural, trim-drag, high-lift system, buffet and maximum-lift considerations, as well as additional factors discussed below. The Boeing 737 airfoil illustrated at 10 in FIG. 4 has a triple-slotted trailing edge flap system and a leading edge flap, or slat, 16 on both the inboard and outboard leading edges. The last flap element of the outboard flap system has a chord that is ten percent that of the total wing chord, while inboard the final flap chord varies from approximately ten percent of the wing chord at the break down to 6.7 percent at the fuselage. The exposed portion of the top side of the outboard flap in retracted position is approximately five percent of the wing chord while inboard it is less.

Figure 7:
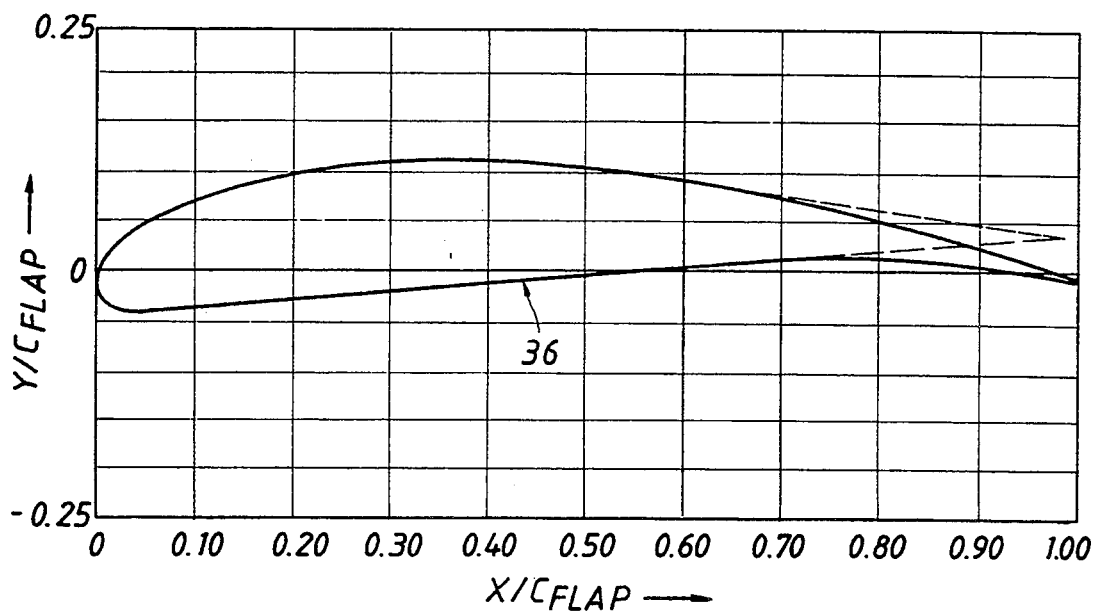
FIG. 7 is an illustration of the contour of the last flap element of FIGS. 4 and 6, modified according to the present invention, showing in dashed lines the original trailing edge contour that is so modified according to the present invention.

One modification to a trailing flap of an airfoil according to the present invention is shown generally at 36 in FIG. 7 as applied to the final flap 18 of a 737 airfoil. The modified version 36 of the flap is shown entirely in solid lines while the original, wedge-shaped trailing edge is shown in dashed lines. It will be appreciated that approximately forty percent of the final upper surface has been made convex rather than straight, and very nearly as much of the under surface has been made concave instead of straight. At the same time, the flap chord has been somewhat extended. The effective flap angle of the trailing edge of the flap has been increased approximately 13°, that being defined as the angle between the mean camber line at the trailing edge of the flap as modified according to the present invention, and the mean camber line of the original, unmodified flap at its trailing edge. The trailing edge of the improved flap 36 is displaced downwardly a distance of approximately five percent of the flap chord from the trailing edge of the unmodified flap. This modification to the contour of the flap may be used for both the inboard and outboard flap, but scaled to the local flap chord.

Displacement of the trailing edge of an improved final flap according to the present invention may be measured perpendicularly from the plane defined by the bottom surface of the unmodified flap. In general, an improved trailing flap for a conventional airfoil according to the present invention provides substantial flap camber and an effective flap angle of at least five degrees, and has a trailing edge that is displaced, by on the order of at least three tenths of one percent of the airfoil chord, relative to the plane defined by the lower surface of the conventional flap.

The modification to the trailing edge flap 36 illustrated in FIG. 7 is incorporated in the rear forty percent of this last flap element, equivalent to approximately four percent of the entire airfoil chord. The spar 34 of the 737 final flap, shown in FIG. 6, is near the thirty percent flap chord location, and dictates to some degree the extent of the trailing edge modification permissible without reconstructing the flap frame. The flap structure ahead of the spar 34 may be unchanged, and only structure to the rear of the spar need be replaced to effect the improvement illustrated in FIG. 7 according to the present invention. Nevertheless, the extent of the modification on the top side of the flap 18 is primarily constrained by the fact that the trailing edge 38 of the second flap element 20 extends to fifty percent of the last flap chord, as shown in FIG. 6. Any modification to the top surface of the flap 18 between zero percent and fifty percent of the flap chord would not be seen by the airflow, at least under cruise conditions. This constraint consequently influences the choice of curvature applied to the undersurface of the flap 18 to effect the improvement according to the present invention.

Calculations of drag improvements for the 737 wing with a trailing flap according to the present invention as illustrated in FIG. 7 have produced the results listed in the Table. In the Table, changes in the drag coefficient $C_D$ for various values of the lift coefficient $C_L$ at different Mach numbers are given. It is clear from the Table that the drag improvement generally increases as the lift coefficient and Mach number increase. Such drag improvement would yield reduced fuel consumption for a given range of flight, or increased range for a given amount of fuel. Other benefits would include an increase in drag rise Mach number of approximately 0.04, increase in buffet boundary, and a possible increase in maximum flight altitude. The drag reductions realized at high values for lift coefficient and low Mach numbers may permit a reduction in fuel-reserve requirements.

TABLE

Estimated drag increments due to flap modification

| $C_L$ | $\Delta C_D$ Mach Number | | | | |
| --- | --- | --- | --- | --- | --- |
| | .4 | .55 | .625 | .725 | .75 |
| 0 | | | | | |
| .1 | | | | | |
| .2 | | | | | | 0 |
| .3 | | | | −.0001 | −.0004 |
| .4 | | | 0 | −.0007 | −.0011 |
| .5 | −.0002 | 0 | −.0005 | −.0017 | −.0025 |
| .6 | −.0005 | −.0008 | −.0012 | −.0030 | −.0047 |
| .65 | −.0007 | −.0014 | −.0018 | −.0038 | −.0047 |
| .7 | −.0009 | −.0020 | −.0024 | −.0047 | |
| .75 | −.0022 | −.0028 | −.0032 | | |
| .80 | | −.0037 | | | |

Figure 8:
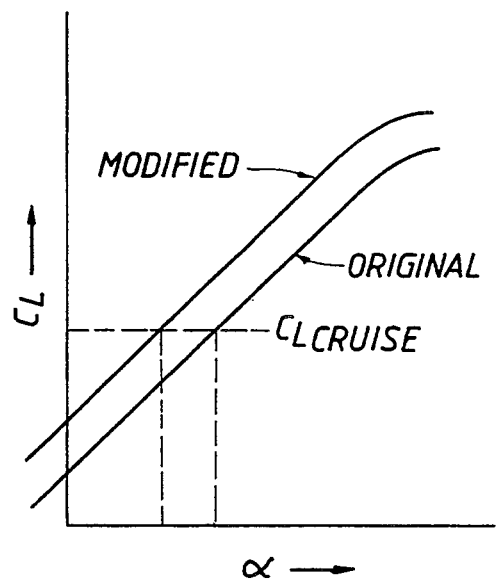
FIG. 8 is a plot of lift coefficient, $C_L$, versus angle of attack, $\alpha$, showing a shift in this function indicating the improvement in lift coefficient for angle of attack achieved by the present invention.

The primary mechanism that permits the reduction in drag by an increase in aft camber according to the present invention is the fact that an airfoil or wing equipped with a modified trailing flap according to the present invention can achieve the same lift at a lower angle of attack than without the trailing flap according to the present invention, and the lift is more evenly distributed over the airfoil chord. FIG. 8 illustrates a shift in the lift coefficient, $C_L$, versus the angle of attack, $\alpha$, function in a case of a conventional airfoil compared to the same airfoil with the improved trailing flap according to the present invention, for example.

Figure 9:
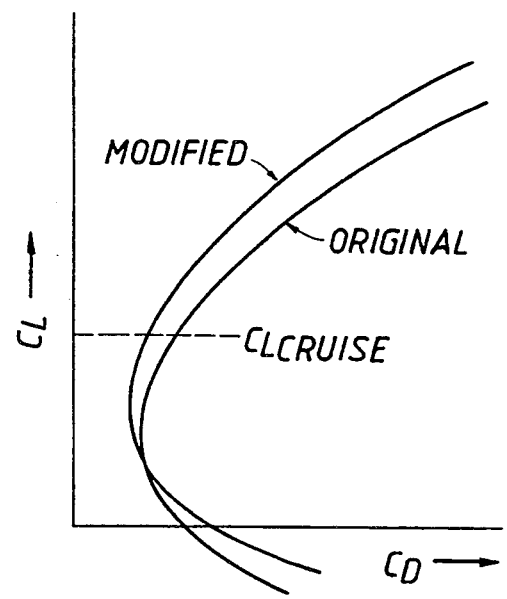
FIG. 9 is a plot of lift coefficient as a function of drag coefficient, $C_D$, showing how the plot of this function is rotated by application of the present invention to reduce drag for a given lift condition.

FIG. 9 is an illustration of a typical plot of the lift coefficient versus the drag coefficient, $C_D$, for a conventional airfoil, for example, showing how the lift curve is rotated when the improved trailing flap according to the present invention is utilized. To obtain significant, or even useful, drag reduction levels the trailing edge modification according to the present invention must shift the lift curve of FIG. 9 on the order of 1.25° to 2.25°, depending on the type of wing airfoil to which the invention is applied. In order to shift the lift curve an amount in this range, the camber required in the improved flap may be substantial depending on the chord of the flap element and how much of its surface is exposed. The amount of camber can be reduced in a case where the flap chord may be extended, as illustrated in FIG. 7, for example.

Generally, wedge-shaped trailing edges of conventional airfoils, for example, provide less effective trailing edge deflection than trailing edges with parallel, or near parallel, lower and upper surfaces, assuming the upper surface is the same for both types of airfoils. FIG. 10 shows an airfoil trailing edge contour 40 in the form of a wedge with no camber. The broken centerline is also the mean camber line in this case of zero camber. FIG. 11 illustrates a wedge-like contour for a trailing edge 42, but with camber and a non-zero effective flap angle B between the original centerline and the mean camber line. FIG. 12 illustrates an airfoil trailing edge contour 44 with parallel upper and lower surfaces, and with camber. The trailing edge contours of FIGS. 11 and 12 have the same convex upper surfaces, but the contour 44 of FIG. 12 has a deeper concave lower surface resulting in greater camber for that contour compared to the contour 42 of FIG. 11, and a greater effective flap angle C. Since the amount of the convex curvature that can be utilized on the upper surface of an airfoil is limited by flow separation considerations, the amount of deflection of the mean camber line that can be produced by curving the upper surface contour is limited. In constructing improved trailing edge flaps according to the present invention, with increased curvature in the upper surface contour, once an acceptable upper surface curved contour is achieved, the lower surface can be curved to give the mean camber line its maximum deflection consistent with structural and flow-separation considerations, generally as illustrated in FIG. 12.

The present invention may be employed utilizing different contour modifications which are effective in reducing drag at cruise and climb lift coefficients, as well as providing a substantial increase in drag rise Mach number. The contour modifications according to the present invention may include improvements which increase the flap chord as well as improvements which do not, and improvements which involve a recontouring of the original final flap and those which are effected by adding to the basic geometry of the final flap.

FIGS. 13–17 illustrate present invention modifications to the final flap of a conventional airfoil, for example, in which the flap is recontoured but the flap chord left essentially unchanged. In each case the modified flap contour is shown in solid lines and the original contour that has been changed is shown in dashed lines. Also, a fragment 46 of the airfoil system immediately preceding the final flap is shown schematically, and is understood to represent a next-to-last flap, spoiler and/or the main airfoil body, in all cases with material coveting the front portion of the top of the final flap. As noted above, in modifying the contour of the top surface of the flap element the onset of flow separation relative to the onset of flow separation on the original flap must be taken into account. It should be noted that the reduction in the adverse pressure gradients in the forward areas of the airfoil caused by the increase in trailing edge camber allows the boundary layer to sustain an increase in pressure gradient near the trailing edge. Additionally, a smooth variation of the surface curvature from the immediately preceding airfoil system top surface to the modified final flap top surface must be maintained. In addition to these limits on the amount of curvature that may be added to the top surface, the amount of trailing edge camber will be dependent on the chord of the flap relative to the airfoil chord since the ratio between these chord values will govern the length of the flap modification relative to the airfoil chord. The higher the ratio of the flap chord to the airfoil chord, the less camber that is required for a given shift in the plot of the lift coefficient as a function of the angle of attack, such as illustrated in FIG. 8.

Figure 13:
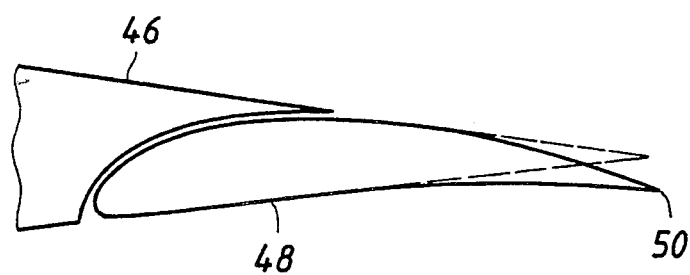
FIG. 13 is a fragmentary, schematic illustration of the contour of the back portion of a heretofore conventional airfoil, showing the final flap element and a portion of the airfoil system immediately preceding the final flap, with the flap modified according to the present invention, and the original contour of the flap shown in dashed lines, the modification involving making the top surface convex and the bottom surface concave essentially without changing the chord of the flap.

In FIG. 13, the exposed top surface of the final flap 48 extends for only about fifty percent of the flap chord beyond the top trailing edge of the preceding airfoil system 46. The modified upper surface of the flap 48 has about as much increased curvature as is possible under such circumstances. In order to achieve the desired effective flap angle, and increased camber, according to the present invention, the bottom surface of the flap is made concave. The final flap trailing edge 50 is thus made as thin, or sharp, as possible consistent with structural requirements, in contrast to the original wedge-like shape of the unmodified flap.

Figure 14:
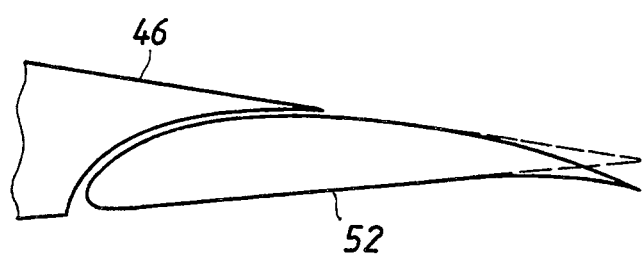
FIG. 14 is a view similar to FIG. 13, but showing a flap modification with a smaller radius of curvature for the concavity added to the lower surface.

FIG. 14 illustrates a flap modification 52 similar to that shown in FIG. 13, with the exception that the concavity added to the bottom surface of the flap 52 in FIG. 14 is deeper and has a smaller radius of curvature. The effective flap angle of the modification of FIG. 14 is greater than that of FIG. 13, but the smaller flap angle of the modification of FIG. 13 will be offset to some extent by the increased length of the modified portion of the bottom surface of that modification of flap 48. Nevertheless, the length of the lower surface modification does not have a strong influence on the drag reduction results. The modification of FIG. 14 is of the same general shape as that shown in FIG. 7, but without the increase in flap chord.

Figure 15:
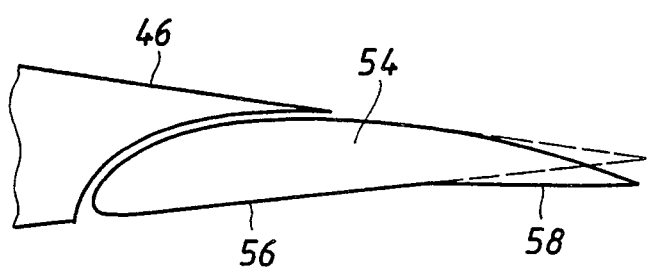
FIG. 15 is a view similar to FIGS. 13 and 14, but wherein the lower surface modification employs a straight line contour.

FIG. 15 shows a modification of a flap 54 in which the top surface has been modified similar to flaps 48 and 52 in FIGS. 13 and 14, respectively, and in which the bottom contour is composed of straight lines, including the original, forward straight line contour 56 and the new, rearward, straight line contour 58. A small filet (not shown) may be used between these segments. The lower surface with the flat, new section 58 will produce lower loads near the flap trailing edge. The bottom surface modification of a flap according to the present invention may be started almost anywhere on the bottom surface from near the leading edge to near the trailing edge. Although the lower surface modification does not have a strong influence on the drag reduction results for the airfoil, for a given length of modification of the bottom surface of a final flap, a curved, concave modification, such as shown in FIGS. 13 and 14, will generally yield a higher effective flap angle and drag reduction than a straight line modification, such as shown in FIG. 15. Also, the curved and flat-sided modifications of the bottom surface of a final flap will produce different pressure distributions.

Figure 16:
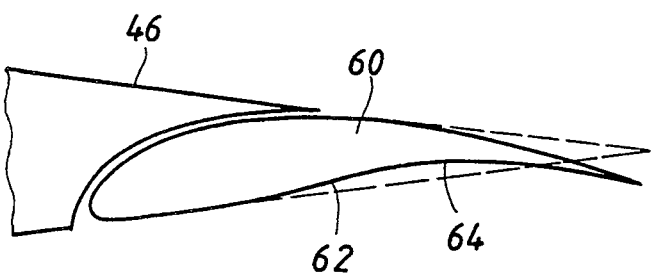
FIG. 16 is a view similar to FIGS. 13–15, but with the bottom surface modification including convex and concave surfaces to penetrate the original flap bottom surface contour.

FIG. 16 shows a final flap contour modification 60 in which the effective flap angle has been substantially increased by curving the top surface and by allowing the lower surface modification to penetrate the original surface contour of the flap. The lower surface has been changed from a straight line contour to a combination of convex and concave contour segments 62 and 64, respectively.

Figure 17:
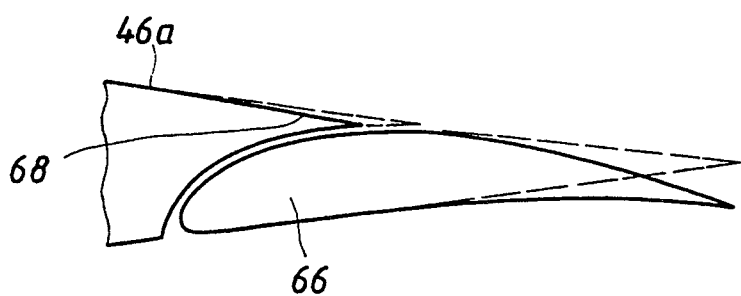
FIG. 17 is a view similar to FIGS. 13 and 14, but including a modification to the trailing edge upper surface of the airfoil system immediately preceding the final flap.

In FIG. 17, the final flap 66 has been modified generally as shown in FIG. 13 but with a greater length of both the top surface and bottom surfaces being curved. Additionally, the upper surface of the trailing edge contour of the immediately preceding flap, or body of the airfoil, 46a has been modified to accommodate the increased length of the modification of the final flap top surface, that is, to maintain the desired smooth variation in overall top surfaces. This modification to the preceding element 46a includes increasing the convex curvature of the top surface of the body 46a, or beveling that surface, to produce a shortened surface 68.

Figure 18:
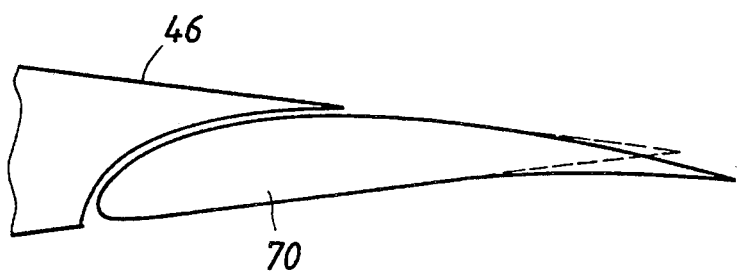
FIG. 18 is a view similar to FIG. 13, but wherein the final flap of the chord is extended.
Figure 19:
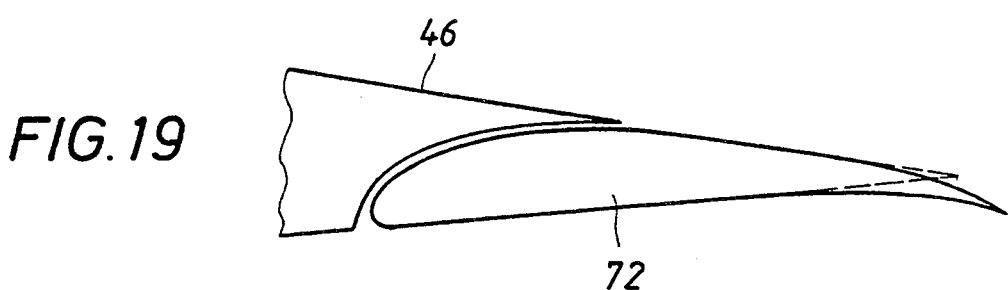
FIG. 19 is a view similar to FIG. 14, but wherein the chord of the final flap is extended.
Figure 20:
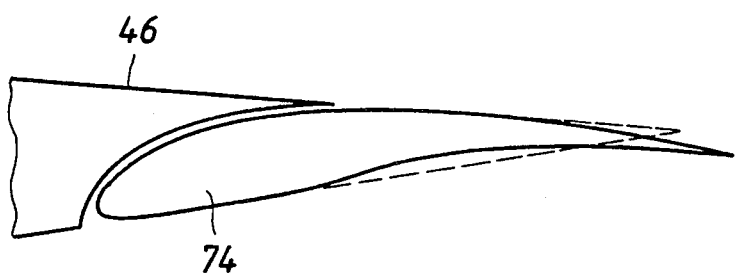
FIG. 20 is a view similar to FIG. 16, but wherein the chord of the final flap element is extended.

FIGS. 18, 19 and 20 illustrate present invention flap modifications 70, 72 and 74, respectively, which are generally patterned after the modifications of FIGS. 13, 14 and 15, respectively, but with the flap chord extended, resulting in greater top and bottom surface lengths which can be curved to provide camber to achieve even more enhanced drag reduction or to reduce the possibility of flow separation. Again, the modification and contour 72 of FIG. 19 display greater aft camber than the version 70 of FIG. 18.

Figure 21:
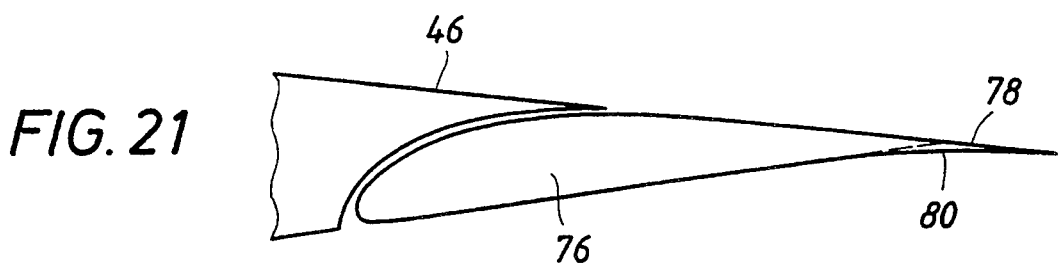
FIG. 21 is a fragmentary, schematic illustration of the contour of the final flap element and a portion of a conventional airfoil system showing a modification of the final flap by extending the upper surface in a straight line and the lower surface in a convex line.
Figure 22:
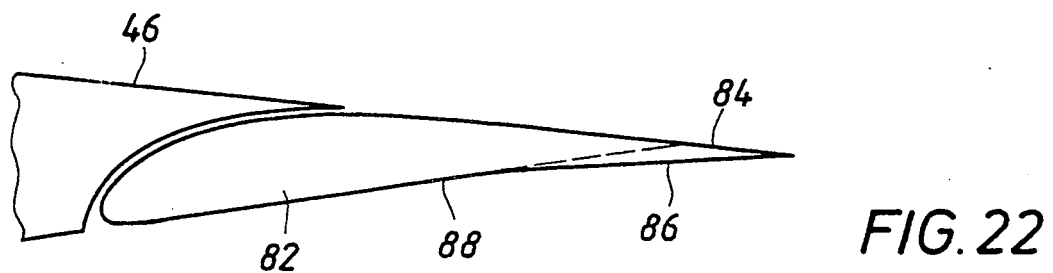
FIG. 22 is a view similar to FIG. 21, but wherein the modification to the lower surface has a straight line contour.

FIGS. 21 and 22 illustrate present invention final flap modifications that maintain the basic geometry of the unmodified flap intact; the modification is achieved by appending, or adding, an extension to the basic flap. The flap 76 in FIG. 21 includes an extension 78 of the original contour that has a straight top surface and a curved, concave bottom surface 80 to maximize the effective flap angle of the modification. The flap 82 in FIG. 22 includes an extension 84 that is similar to the flap extension 78 of FIG. 21, having a flat, top surface, but with a flat, rather than curved, bottom surface contour 86. The flat surface 86 combines with the forward, flat bottom surface 88 to yield a bottom contour similar to, but larger than, the bottom surface contour of the flap 54 of FIG. 15.

The type of flap modification best suited for a given airfoil will depend on factors discussed earlier, as well as structure, trim-drag, high-lift system, buffet and maximum-lift considerations. In some applications, a leading edge modification, such as to the slat 16 illustrated in FIG. 4, can be used in addition to the trailing edge modification to decrease cruise drag. However, the combined effects of such dual modifications are not equal to the sum of the incremental effects obtained by each modification separately. In any given case, the enhancement to performance parameters of the airfoil by a leading edge modification in addition to the modification to the final flap according to the present invention may be so small as to not be economically viable.

Modifications of the final flap contour according to the present invention also result in lower negative, that is, more positive, pressure on the upper surface near the leading edge of the airfoil, in turn reducing the strength of any shocks at high speed, and at the onset of flow separation. Some additional benefits of the resulting more evenly distributed pressures, particular at subsonic speeds, are the reduction in the adverse pressure gradient downstream of the leading edge and over the middle portion of the airfoil and, therefore, reduced possibility of premature flow separation and a reduction in maximum lift coefficient.

In addition to the contours illustrated in FIGS. 7, 11, 12 and 13–22, combinations of the features of extending the chord or not, making the upper surface convex or not, and providing a concave surface or adding a flat surface on the bottom of the flap may be made according to the present invention to reduce drag and increase lift for a given angle of attack. Further, the trailing edge may be modified to a relatively sharp edge, or to generally parallel upper and lower surfaces as shown in FIG. 12, for example. Increasing the camber of the last flap element of a conventional airfoil according to the present invention can be effected to decrease the lift coefficient for a given angle of attack, translating the lift coefficient versus angle of attack curve in a range from 1.25° to 2.25°, depending on the specific airfoil, the chord of the flap relative to the wing chord and the amount of the flap exposed to the flow. Generally, there will be an optimum amount of camber for a given Mach number, that is, one which maximizes the drag improvement. When selecting a modification according to the present invention, the effectiveness of the modification at both high and low speeds should be considered. If too much camber is used, then the low and/or high speed performance can be degraded. Too little camber will result in too little drag improvement relative to the cost of fabricating and installing the modified flap, for example. The present invention provides drag reductions on the order of three percent to five percent of cruise lift and Mach numbers simply by modifying the trailing flap as described.

The foregoing disclosure and description of the invention is illustrative and explanatory thereof, and various changes in the size, shape and materials as well as in the details of the illustrated construction may be made within the scope of the appended claims without departing from the spirit of the invention.

What is claimed is:

1. An improved trailing flap for a conventional airfoil, the improved trailing flap comprising a flap whose upper and lower trailing surfaces combine to provide substantial flap camber and an effective flap angle of at least five degrees, and whose trailing edge is displaced, by on the order of at least three tenths of one percent of the airfoil chord, relative to the plane defined by the lower surface of a prior conventional flap of the airfoil, thereby establishing a more evenly distributed lift over the airfoil chord and an increase in lift for a given angle of attack resulting in a reduction in drag per lift.

2. An improved trailing flap as defined in claim 1 wherein the contour of the upper surface of the flap is convex at the trailing edge of the flap.

3. An improved trailing flap as defined in claim 2 wherein the contour of the lower surface of the flap is concave at the trailing edge of the flap.

4. An improved trailing flap as defined in claim 3 wherein the chord of the flap is extended compared to the chord of the conventional flap.

5. An improved trailing flap as defined in claim 2 wherein the lower surface of the flap comprises a contour of at least two straight surfaces combining to provide a concave lower surface contour.

6. An improved trailing flap as defined in claim 2 wherein the contour of the lower surface is convex between the leading edge of the flap and the trailing edge of the flap, and is concave at the trailing edge of the flap.

7. An improved trailing flap as defined in claim 1 wherein the chord of the flap is substantially equal to the chord of the conventional flap.

8. An improved trailing flap as defined in claim 7 wherein the contour of the upper surface of the flap is convex at the trailing edge of the flap and the contour of the lower surface of the flap is concave at the trailing edge of the flap.

9. An improved trailing flap as defined in claim 1 wherein the chord of the flap is extended compared to the chord of the conventional flap.

10. An improved trailing flap as defined in claim 9 wherein the contour of the upper surface of the flap is convex at the trailing edge of the flap and the contour of the lower surface of the flap is concave at the trailing edge of the flap.

11. An improved trailing flap as defined in claim 9 wherein the contour of the upper surface of the flap is straight at the trailing edge of the flap.

12. An improved trailing flap as defined in claim 11 wherein the contour of the lower surface of the flap is concave at the trailing edge of the flap.

13. An improved trailing flap as defined in claim 11 wherein the lower surface of the flap comprises a contour of at least two straight surfaces combining to provide a concave lower surface contour.

* * * * *